United States Patent [19]

Ortmans et al.

[11] Patent Number: 4,830,913

[45] Date of Patent: May 16, 1989

[54] FIRE-RESISTANT GLAZING AND METHOD OF MAKING SAME

[75] Inventors: Gunter Ortmans; Michael Hassiepen, both of Aachen, Fed. Rep. of Germany

[73] Assignee: Saint-Gobain Vitrage, Courbevoie, France

[21] Appl. No.: 902,250

[22] Filed: Aug. 29, 1986

[30] Foreign Application Priority Data

Aug. 30, 1985 [DE] Fed. Rep. of Germany ....... 3530968

[51] Int. Cl.⁴ ............................ E06B 3/66; E06B 5/16
[52] U.S. Cl. ........................................ 428/34; 428/913; 428/432; 52/232
[58] Field of Search .............. 428/34, 913, 435, 474.4, 428/920, 432; 52/232; 156/99, 109

[56] References Cited

U.S. PATENT DOCUMENTS

| | | | |
|---|---|---|---|
| 3,640,837 | 2/1972 | Gaeth et al. | 428/215 |
| 3,892,577 | 7/1975 | Sugahara et al. | 524/417 |
| 3,940,549 | 2/1976 | Whittum et al. | 428/484 |
| 4,071,380 | 1/1978 | Shutt | 428/450 |
| 4,071,649 | 1/1978 | Jacquemin et al. | 428/913 |
| 4,451,312 | 5/1984 | Nolte | 52/232 |

FOREIGN PATENT DOCUMENTS 1541371 2/1979 United Kingdom .

*Primary Examiner*—Nancy A. B. Swisher
*Attorney, Agent, or Firm*—Pennie & Edmonds

[57] ABSTRACT

A fire resistant glazing comprising at least two parallel glass sheets, frame means for separating each of said sheets one from another by a predetermined distance and defining an intermediate space therebetween which is sealed at the periphery of the glass sheets and a hydrogel substantially filling said intermediate space, said hydrogel comprising about 70–90% by weight of water, about 10–30% by weight of a water soluble salt and, as an additive, from about 0.2 to about 2.0% by weight, in relation to the amount of water soluble salt, of a water soluble anticorrosive compound. The anticorrosive compound may be an alkali phosphate, an alkali tungstate or an alkali molybdate.

29 Claims, 1 Drawing Sheet

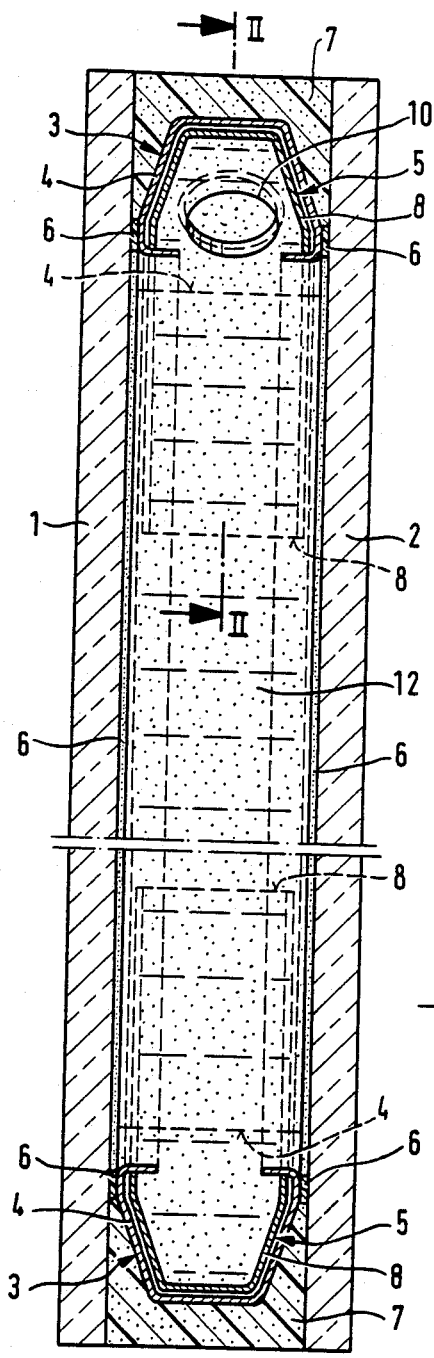
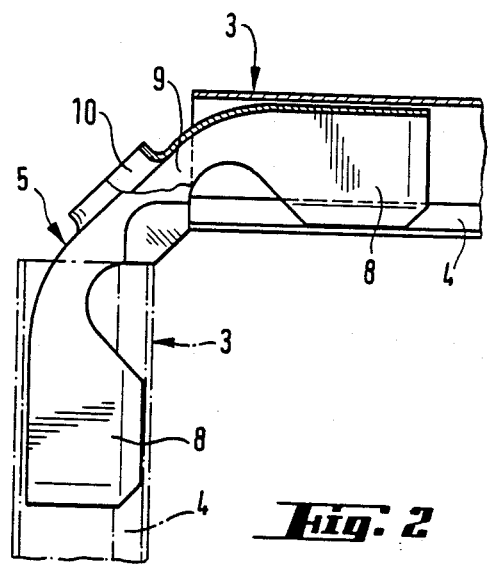
Fig. 1
Fig. 2

FIRE-RESISTANT GLAZING AND METHOD OF MAKING SAME

TECHNICAL FIELD

The invention pertains to improvements in fire-resistant glazings which are filled with an aqueous gel.

BACKGROUND OF THE INVENTION

Fire-resistant, multiple pane glazings, formed of at least two spaced apart parallel glass sheets having an aqueous thermal barrier therebetween, were originally developed for forming port holes or the walls of glove boxes used in the nuclear industry. Since water, which has a high heat of vaporization, is essentially transparent, it was initially utilized as a thermal barrier between the glass sheets of such glazings. Another advantage to the use of water is that it has an excellent neutron section which, in the event of a shock or fire, would be of assistance in preventing the contamination of the environment external to the glazing with dangerous radioactivity. A disadvantage to the use of water for such purposes, however, is that in case of accident, shock or fire the glass sheets may become broken, thus permitting the water to flow away from where it is most needed.

Fire proof glazings have also been constructed by placing a solid layer of a material between the two sheets of glass which, in response to heat radiation, is transformed into an insulating foam. One example of such a composition is a hydrated alkaline silicate. Such glazings are described in French Pat. No. 2,027,646. Their optical properties and, in particular, their transparency, leave something to be desired however. Further, they do not have the capability to remain fireproof for thirty minutes except when certain methods of construction are used in which, for example, the layer of silicate is reinforced with glass fibres or several separate panes are mounted in the same frame in order to form a multiple pane glazing, which reduces the optical quality even further.

In order to eliminate the risk of water leakage, glazings have been constructed with the space between the glass sheets filled with an aqueous gel. These gels are formed by a polymer which is present in the form of a network of microcavities which may be open or closed and which contain a liquid, preferably water. French Pat. No. 1,458,945 discloses the use of such transparent polymer gels. The network of closed microcavities prevents the gel and the liquid it contains from flowing away if the glass sheets should break. However, for the thicknesses compatible with weight and cost requirements utilized in the construction industry, the fire resistance of these glazings is not sufficient to fulfill the requirements of fire security standards which are required by many municipal authorities.

One such commonly required fire security standard, well-known to those of ordinary skill in this area, is DIN Standard 4102. This standard defines a method of testing and the criteria to which glass window panes for buildings must conform in order to be classified as "fire resistant". Materials tested according to this standard are classified by the time during which, under standard trial conditions, they remain capable of performing the following functions:

- sufficient mechanical strength for the element considered to continue to carry out its function,
- thermal insulation,
- resistance to flames,
- absence of the emission of inflammable gas from the surface exposed to heat during the trial The thermal insulation property of a material is considered satisfactory when the mean heating of the non-exposed face, i.e., the mean of the temperatures recorded on the non-exposed face and the maximum heating, i.e., the maximum temperature indicated by the least favorable thermo-couple arranged on the non-exposed face do not exceed, respectively, 140° and 180° C. The "fireproof" elements are those for which all the criteria mentioned above are met.

In each category the classification expresses, as a function of the time during which the elements satisfy the trials, the degree of retention of the above-mentioned properties. The "degree" is the average time equal to or immediately less than the duration during which the element has met the properties required. For applications in the building construction industry the requirement is for windowpanes having "fireproof" characteristics for at least thirty minutes without the need to make the window excessively thick.

A further improvement to the use of polymerized aqueous gels for this purpose was disclosed in British Pat. No. 1,541,371 published Feb. 28, 1979, which is an English language equivalent of German Patent Application No. 2,713,849 cited in the priority application. The thermal barrier disclosed therein comprises a hydrogel composed of about 70–90% by weight of water and about 10–30% by weight of a water soluble salt. The gel may advantageously be based on a derivative of acrylic acid, and the water soluble salt may be chosen from the group formed by aluminates, silicates, stannates, plumbates, alums, borates, phosphates and other salts of an alkali metal or ammonium.

The flame retardant effect of such glazings lies in the fact that initially, considerable amounts of thermal energy are absorbed by evaporation of the water. During the period in which the evaporation takes place, the temperature of the glazing is raised only slightly on the surface which is removed from direct contact with the heat. It remains substantially below the acceptable DIN 4012 value, which is about 140° C. below the initial temperature.

Once the water has evaporated, a foamy protective shield is formed by the residual salt compound. This shield thus prevents the penetration of thermal radiation through the glazing. By varying the thickness of the gel layer, glazings may be produced having a fire resistance corresponding to F30 or F60 according to the requirements of DIN 4102, Part II. Thus, when a glazing constructed in this manner is subjected to a flame, it has been found that the glass sheet which is exposed to the fire breaks rapidly. Subsequently, however, the gel layer forms a screen which prevents the heat from spreading and reaching the second pane. Glazings of this type which are constructed with three glass plates may even attain a fire resistant classification of F90.

To form an effective shield against the thermal currents normally produced by a fire, a sufficiently large amount of the salt must be contained in the gel layer for a coherent foam of sufficient consistency to be formed. Consequently, the salt must have a proportionally high solubility in water. In addition, the salt solution, as well as the structure of the polymer forming the gel, should not exhibit cloudiness or coloring, i.e., it should be markedly transparent. The salts particularly suitable for practical use under these conditions, namely, chlorides of sodium, calcium, magnesium or other salts, exert a strongly aggressive and corrosive effect on the metal of the frame separating the glass plates. Even with the use of various steels or other metals such as nickel and/or chromium, which are corrosion resistant, corrosion can appear on the separating frame and, if unfavorable conditions are encountered, the products of the corrosion can be dissolved in the gel leading to localized discoloration and/or cloudiness of the gel layer.

Applicant's have solved the problem described above by developing a fire-resistant glazing which prevents the formation of discoloration or cloudiness in the gel caused by corrosion of the metal separation frame. To eliminate such disadvantageous clouding of the glazing, a water soluble anticorrosive composition is advantageously added to the hydrogel.

SUMMARY OF THE INVENTION

Applicants' invention therefore concerns a fire resistant glazing comprising at least two parallel glass sheets, metal frame means for separating each of said sheets one from another by a predetermined distance, which frame is adhesively connected to each of said glass sheets and defines an intermediate space therebetween which is sealed at the periphery of the glass sheets with an adhesive sealing compound.

The intermediate space between the glass plates is substantially filled through an opening in the frame with a hydrogel comprising from about 70–90% by weight of water and about 10–30% by weight of a water soluble salt. A sufficient amount of an anticorrosive compound is added to the hydrogel to prevent the corrosion of the metal frame means by the water soluble salt of the hydrogel. By use of the term "alkali" herein with regard to the composition of the presently claimed hydrogel and/or the anticorrosive component, applicants mean to include those compounds including elements present as members of Group IA and Group IIA of the Periodic Table.

The anticorrosive compound is advantageously an alkali phosphate, an alkali tungstate or an alkali molybdate. The alkali phosphate is preferably selected from the group consisting of sodium pyrophosphate, sodium hydrogenophosphate and trisodium phosphate. The anticorrosive compound is present in the hydrogel in an amount ranging from about 0.2% to about 2% by weight in relation to the amount of the water soluble salt.

BRIEF DESCRIPTION OF THE DRAWINGS

FIG. 1 is a cross-sectional view of a fire-resistant glazing constructed according to the present invention; and FIG. 2 is a sectional view taken along line II—II of FIG. 1.

DETAILED DESCRIPTION OF THE PREFERRED EMBODIMENTS

Contrary to the usual measures taken to prevent the corrosion of metal structural members, namely, the choice of corrosion-resistant materials or the coating of the frame material with a corrosion-resistant coating, the anticorrosive agent in applicants' invention is added directly to the gel medium which causes the corrosion. Thus, all parts of the separation frame which come in contact with the hydrogel are necessarily contacted at the same time by the anticorrosive agent. The hydrogel is therefor capable of acting as a thermal barrier in a fire resistant glazing without actively attacking the metal structural members which comprise the spacer frame located between the glass sheets.

Even prior to the addition of the anticorrosive compound, the hydrogel utilized by applicants' exhibits a complex composition. It contains, in addition to a high concentration of saline, both a polymer and a catalyst. With the addition of applicants' anticorrosive compound, the gel remains perfectly transparent and colorless and the polymerization reaction is not hindered to any degree.

Referring initially to FIG. 1 there is illustrated a double pane glazing constructed according to the present invention. Two panes of tempered silicate glass 1, 2 are spaced apart by metal frame means 3. Frame 3 is made up of straight metal sections 4 having a U-shaped cross-sectional configuration. Sections 4 are connected to one another by angle pieces 5. Subsequent to the construction of rectangular spacer frame 3, the completed frame is attached by means of an adhesive 6 to an inner surface of each of glass plates 1, 2. The remaining space between the outer peripheral edges of frame 3 and the outer edges of glass plates 1, 2 is then filled with an adhesive sealing compound 7.

Each of angle pieces 5, located at the corners of the glazing, comprises branch portions 8, for locking insertion into an end of a straight frame section 4. These portions 8 are located on either side of a connecting section 9 forming, in relation to connector 9, an angle of about 45°. At least one of connecting sections 9 is provided with opening 10 to be used for filling the space between panes 1, 2 with a liquid intended to form hydrogel interlayer 12 and for degassing the intermediate space during the filling process. The structural members 4, 5 of frame 3 are constructed of a corrosion-resistant steel comprising, for example, 18% chromium, 12% nickel and 2.25% molybdenum. Many additional compositions for these structural members are known by those skilled in the art and this example should not be construed as limiting the invention in any manner. Even with the use of materials such as those described, however, the corrosion reaction still occurs, particularly at the cutting sites which are rough or on the strongly deformed zones of the angle pieces.

In order to construct applicants' fire resistant glazing, frame 3 is initially assembled by inserting each branch portion 8 of an angle piece 5 into a straight frame member 4. A layer of glue 6 is then spread upon the outer longitudinal surfaces of frame 3, which frame 3 is then glued to glass plates, 1, 2 positioned on either side of frame 3 in a parallel orientation. The intermediate space between the glass plates and the frame is thereafter substantially filled through opening 10 with a polymerizable solution.

To polymerize the solution to the consistency of a gel, water-soluble monomers are utilized having as a base a derivative of acrylic acid, which polymerizes in the aqueous solution. Polymerization is initiated by the addition of a catalytic system formed of a catalytic component, preferably a peroxide, and an accelerator, which is preferably diethylaminopropionitrile (DEAPN) or triethanolamine in glycol (TEAG). Optionally, another cross-linking agent, preferably N,N'-methylenebisacrylamide (MBA) may be added.

A number of substances have proven to be effective for use as anticorrosive compounds. These include alkali phosphates, alkali tungstates and alkali molybdates.

In particular, the most effective material has proven to be various sodium phosphates, preferably sodium pyrophosphate, sodium hydrogenophosphate and trisodium phosphate. These compounds may be introduced into the hydrogel either singly or in the form of a mixture of several of these compounds.

Once the solution is introduced into the intervening space between glass plates 1, 2 and frame 3 it is polymerized so as to form a hydrogel, openings 10 are closed and the cavity between glass plates 1, 2 on the outside of frame 3 is filled with a hardened adhesive sealing compound 7.

EXAMPLES

The following examples illustrate a number of compositions which may preferably be utilized for forming the hydrogel interlayer. These examples are set forth for the purpose of illustration only and are not to be construed as limiting the scope of the invention in any manner.

EXAMPLE I

The following materials were mixed in solution and the resultant solution was then degassed:

| Water | 600 grams |
|---|---|
| $MgCl_2.6H_2O$ | 200 grams |
| Acrylamide | 40 grams |
| N—methylolacrylamide | 40 grams |
| diethylaminopropylnitrile (DEAPN) | 2 grams |
| N,N'—methylenebisacrylamide (MBA) | 0.05 gram |
| $Na_2WO_4$ | 2 grams |

The pH of the solution was adjusted to 8.5–9.0 and 13 grams of a 5% ammonium persulfate solution was added and mixed with stirring. The resultant solution was introduced into the intermediate sace of the double glazing so as to completely fill it. At the end of 30 minutes, the solution was entirely polymerized so as to form the hydrogel.

This glazing did not exhibit any corrosion of its metal frame, even under the most severe testing conditions.

EXAMPLE II

The following materials were mixed in solution and the resultant solution was then degassed:

| Water | 820 grams |
|---|---|
| NaCl | 180 grams |
| Urea | 7 grams |
| Acrylamide | 45 grams |
| N—methylolacrylamide | 45 grams |
| Triethanolamine (TEAG) | 1.5 grams |
| N,N'—methylenebisacrylamide (MBA) | 0.04 gram |
| $Na_3PO_4$ | 1 gram |

The pH of the solution was adjusted to 8.5–9.0 and 15 grams of a 5% ammonium persulfate solution was added and mixed with stirring. The resultant solution was introduced into the intermediate space of the double glazing so as to completely fill it. At the end of 20 minutes, the solution was completely polymerized into the hydrogel.

This glazing did not exhibit any corrosion of its metal frame after a long period under the most severe testing conditions.

EXAMPLE III

The following materials were mixed in solution and the resultant solution was then degassed:

| Water | 590 grams |
|---|---|
| $CaCl_2.2H_2O$ | 300 grams |
| Urea | 5 grams |
| Rocagil 1295* | 150 grams |
| Triethanolamine (TEAG) | 1 gram |
| N,N'—methylenebisacrylamide (MBA) | 0.05 gram |
| $Na_2WO_4$ | 1 gram |
| $Na_2MoO_4$ | 1 gram |

*A registered trademark of the Rhone Poulenc Co. for an acrylamide composition.

The pH of the solution was adjusted to 8.5–9.0 and 12 grams of a 2.5% peroxidisulfate ($Na_2S_2O_8$) solution was added and mixed with stirring. The resultant solution was introduced into the intermediate space of the double glazing so as to completely fill it. Approximately 40 minutes was required to permit the complete polymerization of the hydrogel.

This glazing did not exhibit any corrosion of its metal frame under the most severe testing conditions.

EXAMPLE IV

The following components were mixed in solution and the resulting solution was then degassed:

| Water | 750 grams |
|---|---|
| NaCl | 150 grams |
| Urea | 7.5 grams |
| Acrylamide | 35 grams |
| N—methylolocrylamide | 35 grams |
| Triethanolamine (TEAG) | 2 grams |
| N,N'—methylenebisacrylamide (MBA) | 0.04 gram |
| $Na_3PO_4$ | 0.75 gram |
| $Na_2HPO_4.12H_2O$ | 0.75 gram |

The pH of the solution was adjusted to 8.5 to 9.0 and 20 grams of a 2.5% aqueous solution of peroxidosulfate ($Na_2S_2O_8$) was added and mixed with stirring. The resultant solution was introduced into the intermediate space of the double glazing so as to completely fill it. After 20 minutes, the solution had totally polymerized into the hydrogel.

The resultant glazing thus produced did not exhibit any corrosion, even at elevated temperatures.

EXAMPLE V

The following materials were mixed in solution and the resultant solution was then degassed:

| Water | 750 grams |
|---|---|
| NaCl | 160 grams |
| Rocagil 1295 | 180 grams |
| Diethylaminepropylnitrile (DEAPN) | 1.5 grams |
| N,N'—methylenebisacrylamide (MBA) | 0.06 gram |
| $Na_2HPO_4$ | 2 grams |

The pH of the solution was adjusted to 8.5 to 9.0 and 25 grams of a 2.5% ammonium persulfate solution was added and mixed with stirring. The resultant solution was introduced into the intermediate space of the double glazing so as to completely fill it. The solution was totally polymerized to the hydrogel at the end of 25 minutes.

The glazing thus produced did not exhibit any corrosion after long periods of testing under severe conditions.

While it is apparent that the invention herein disclosed is well calculated to fulfill the objectives above stated, it will be appreciated that numerous modifications and embodiments may be devised by those skilled in the art, and it is intended that the appended claims cover all such modifications and embodiments as fall within the true spirit and scope of the present invention.

We claim:

1. A markedly transparent fire resistant glazing comprising at least two parallel glass sheets, frame means for separating each of said sheets one from another by a predetermined distance and defining an intermediate space therebetween which is sealed at the periphery of the glass sheets and a substantially colorless hydrogel substantially filling said intermediate space, said hydrogel comprising:
   about 70–90% by weight of water;
   about 10–30% by weight of a water soluble halide salt; and
   as an additive, a water soluble anticorrosive compound.

2. The fire resistant glazing of claim 1 wherein the anticorrosive compound is an alkali phosphate, an alkali tungstate or an alkali molybdate.

3. The fire resistant glazing of claim 2 wherein the alkali phosphate is sodium pyrophosphate, sodium hydrogenophosphate or trisodium phosphate.

4. The fire resistant glazing of claim 1 wherein the anticorrosive compound is present in an amount ranging from about 0.2 to about 2.0% by weight in relation to the amount of water soluble salt.

5. The fire resistant glazing of claim 1 wherein said hydrogel further comprises a polymerizable gel forming compound and an accelerator.

6. The fire resistant glazing of claim 5 wherein the polymerizable gel-forming compound is an acrylic acid derivative, the halide is an alkali metal chloride and the accelerator contains an amine group.

7. The fire resistant glazing of claim 6 wherein the polymerizable gel-forming compound is acrylamide or N-methylolacrylamide, the halide is sodium, magnesium or calcium chloride and the accelerator is diethylaminopropylnitrile or triethanolamine in glycol.

8. The fire resistant glazing according to one of claims 5, 6, or 7 wherein the hydrogel contains a cross-linking agent.

9. The fire resistant glazing according to claim 8 wherein the cross-linking agent is N,N'-methylenebisacrylamide.

10. In a markedly transparent flame resistant glazing comprising at least two parallel glass sheets, metal frame means for separating each of said sheets one from another by a predetermined distance and defining an intermediate space therebetween which is sealed at the periphery of the glass sheets, and a substantially colorless hydrogel substantially filling said intermediate space, said hydrogel comprising about 70–90% by weight of water and about 10–30% by weight of a water soluble halide salt, a method for preventing corrosion of the metal frame means which comprises:
   adding to said hydrogel, prior to substantially filling said intermediate space, a sufficient amount of an anticorrosive compound wherein said anticorrosive compound is an alkali phosphate, an alkali tungstate or an alkaline molybdate.

11. The flame resistant glazing of claim 10 wherein the alkali phosphate is sodium pyrophosphate, sodium hydrogenophosphate or trisodium phosphate.

12. The flame resistant glazing of claim 10 wherein the anticorrosive compound is present in an amount ranging from about 0.2% to about 2.0% by weight in relation to the amount of water soluble salt.

13. In a markedly transparent flame resistant glazing comprising at least two parallel glass sheets, metal frame means for separating each of said sheets one from another by a predetermined distance and defining an intermediate space therebetween which is sealed at the periphery of the glass sheets, and a substantially colorless hydrogel substantially filling said intermediate space, said hydrogel comprising about 70–90% by weight of water and about 10–30% of a water soluble salt, the improvement which comprises:
   adding to said hydrogeol prior to substantially filling said intermediate space, a sufficient amount of an anticorrosive compound to prevent corrosion of the metal frame means by said water soluble salt of said hydrogel, wherein said anticorrosive compound is an alkali phosphate, an alkali tungstate or an alkaline molybdate.

14. The flame resistant glazing of claim 13 wherein the alkali phosphate is sodium pyrophosphate, sodium hydrogenophosphate or trisodium phosphate.

15. The flame resistant glazing of claim 13 wherein the anticorrosive compound is present in an amount from about 0.2% to about 2.0% by weight in relation to the amount of water soluble salt.

16. A markedly transparent flame resistant glazing comprising at least two parallel glass sheets, frame means for separating each of said sheets one from another by a predetermined distance and defining an intermediate space therebetween which is sealed at the periphery of the glass sheets and a substantially colorless hydrogel substantially filling said intermediate space, said hydrogel comprising:
   from about 70 to 90% by weight of a water component;
   from about 10 to 30% by weight of a water soluble salt component, said salt component selected from the group consisting of NaCl, $CaCl_2$, $MgCl_2$ and mixtures thereof;
   a sufficient amount of a polymerizable gel-forming compound selected from the group consisting of acrylamide and N-methylolacrylamide to polymerize said components to the consistency of a gel;
   a sufficient amount of a polymerization catalyst to initiate a polymerization reaction within said hydrogel;
   a sufficient amount of an accelerator component to increase the rate at which said polymerization reaction occurs within said gel; and
   as an additive, a water-soluble anti-corrosive compound added in an amount of from about 0.2 to about 2.0% by weight in relation to the amount of said water-soluble salt, said anti-corrosive compound selected from the group consisting of alkali phosphates, alkali tungstates and alkali molybdates.

17. The flame resistant glazing of claim 16 wherein said alkali phosphate is sodium pyrophosphate, sodium hydrogen phosphate, tri-sodium phosphate or a mixture thereof.

18. The flame resistant glazing of claim 16 wherein said polymerization catalyst is an oxidizing agent and said accelerator component is diethylaminopropionitrile or triethanolamine in glycol.

19. The flame resistant glazing of claim 16 wherein said hydrogel further comprises a cross-linking agent.

20. The flame resistant glazing of claim 19 wherein said cross-linking agent is NN'-methylene-bis-acrylamide.

21. A markedly transparent fire resistant glazing comprising at least two parallel glass sheets, frame means for separating each of said sheets one from another by a predetermined distance and defining an intermediate space therebetween which is sealed at the periphery of the glass sheets and a substantially colorless hydrogel substantially filling said intermediate space, said hydrogel comprising:
- from about 70–90% by weight of water;
- from about 10–30% by weight of a water soluble salt comprising a halide compound; and
- as an additive a water soluble anti-corrosive compound added in an amount of from about 0.2 to about 2.0% by weight in relation to the amount of soluble salt, said anticorrosive compound selected from the group consisting of an alkali tungstate and an alkali molybdate.

22. The fire resistant glazing of claim 21 wherein said hydrogel further comprises a polymerizable gel-forming compound and an accelerator component.

23. In a markedly transparent flame resistant glazing comprising at least two parallel glass sheets, metal frame means for separating each of said sheets one from another by a predetermined distance and defining an intermediate space therebetween which is sealed at the periphery of the glass sheets and a substantially colorless hydrogel substantially filling said intermediate space, said hydrogel comprising about 70–90% by weight of water and about 10–30% by weight of a water soluble salt comprising a halide compound, a method for preventing corrosion of the metal frame means which comprises:
- adding to said hydrogel prior to substantially filling said intermediate space, a sufficient amount of an alkali tungstate or an alkali molybdate to serve as an anticorrosive compound.

24. In a markedly transparent flame resistant glazing comprising at least two parallel glass sheets, metal frame means for separating each of said sheets one from another by a predetermined distance and defining an intermediate space therebetween which is sealed at the periphery of the glass sheets, and a hydrogel substantially filling said intermediate space, said hydrogel comprising about 70–90% by weight of water and about 10–30% by weight of a water soluble salt, the improvement which comprises:
- adding to said hydrogel prior to substantially filling said intermediate space a sufficient amount of an anticorrosive compound selected from the group consisting of an alkali tungstate and an alkali molybdate to prevent corrosion of the metal frame means by said water soluble salt of said hydrogel.

25. The glazing of claim 24 wherein the improvement further comprises utilizing a water soluble salt comprising a halide compound.

26. A markedly transparent fire resistant glazing comprising at least two parallel glass sheets, frame means for separating each of said sheets one from another by a predetermined distance and defining an intermediate space therebetween which is sealed at the periphery of the glass sheets and a substantially colorless hydrogel substantially filling said intermediate space, said hydrogel consisting essentially of:
- from about 70–90% of water;
- from about 10–30% by weight of a water-soluble salt comprising a halide compound; and
- as an additive, a sufficient amount of a water soluble compound selected from the group consisting of an alkali tungstate and an alkali molybdate to prevent corrosion of said frame means by said hydrogel.

27. The fire resistant glazing of claim 26 wherein the anti-corrosive compound is present in an amount ranging from about 0.2 to about 2.0% by weight in relation to the amount of said water soluble salt.

28. The fire resistant glazing of claim 26 wherein said halide compound is an alkali metal chloride.

29. A markedly transparent fire resistant glazing comprising at least two parallel glass sheets, frame means for separating each of said sheets one from another by a predetermined distance and defining an intermediate space therebetween which is sealed at the periphery of the glass sheets, and a substantially colorless hydrogel substantially filing said intermediate space, said hydrogel comprising:
- about 70–90% by weight of water;
- about 10–30% by weight of a water soluble halide salt; and
- as an additive, a water soluble anticorrosive compound wherein said anticorrosive compound is a phosphate, a tungstate or a molybdate compound.

* * * * *